US 6,718,791 B2

(12) United States Patent
Sakuma

(10) Patent No.: US 6,718,791 B2
(45) Date of Patent: Apr. 13, 2004

(54) HEAT PUMP AIR CONDITIONING SYSTEM FOR VEHICLES

(75) Inventor: Choji Sakuma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/421,536

(22) Filed: Apr. 23, 2003

(65) Prior Publication Data

US 2003/0209026 A1 Nov. 13, 2003

(30) Foreign Application Priority Data

May 9, 2002 (JP) ........................................ 2002-134595

(51) Int. Cl.[7] ................................................ F25B 13/00
(52) U.S. Cl. ........................ 62/324.1; 62/244; 62/196.4
(58) Field of Search ................................ 62/196.4, 239, 62/244, 324.1, 324.6

(56) References Cited

U.S. PATENT DOCUMENTS

| | | | |
|---|---|---|---|
| 4,539,817 A | * | 9/1985 | Staggs et al. .................. 62/149 |
| 4,688,394 A | * | 8/1987 | Waldorf ........................ 62/243 |
| 5,299,431 A | * | 4/1994 | Iritani et al. ................... 62/243 |
| 5,878,589 A | * | 3/1999 | Tanaka et al. ................. 62/199 |
| 6,237,681 B1 | * | 5/2001 | Takano et al. ............... 165/241 |

FOREIGN PATENT DOCUMENTS

JP          60076414 A         4/1985

* cited by examiner

*Primary Examiner*—William E. Tapolcai
(74) *Attorney, Agent, or Firm*—Marchant & Gould, P.C.

(57) ABSTRACT

A heat pump air conditioning system having an outside heat exchanger which is disposed in an engine compartment of a vehicle is provided. The outside heat exchanger consists of a first outside heat exchanger disposed forward of an engine and a second outside heat exchanger disposed near the engine except the front, especially rearward of the engine. When heating the passenger compartment, the second outside heat exchanger acts as a heat absorber, utilizing the heat of the engine, and effectively heating the interior.

2 Claims, 8 Drawing Sheets

[COOLING]

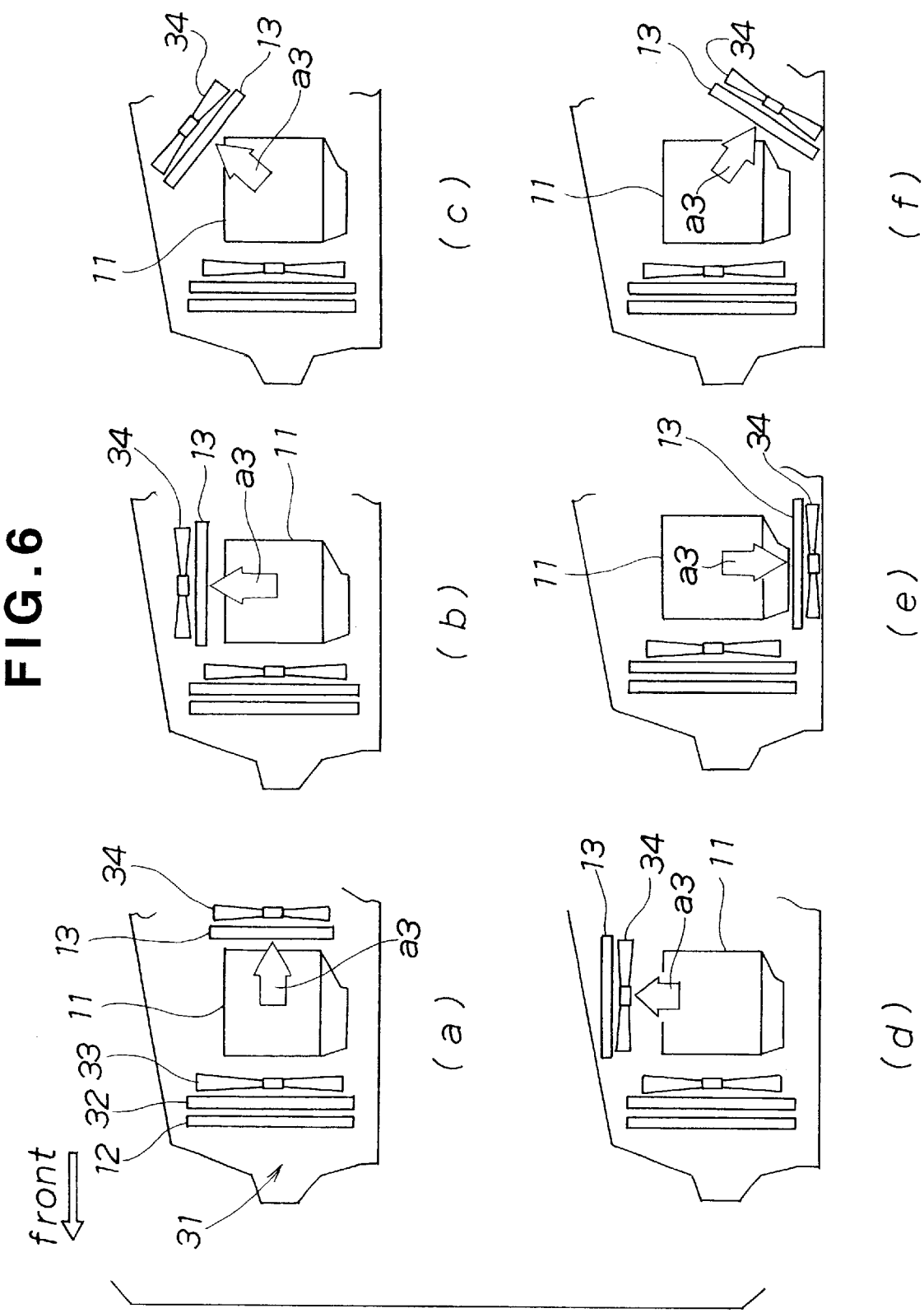

HEAT PUMP AIR CONDITIONING SYSTEM FOR VEHICLES

FIELD OF THE INVENTION

The present invention relates to a heat pump air conditioning system for a vehicle which has improved heating performance and effectively heats a passenger compartment even when an outside air temperature is low and a vehicle speed is high.

BACKGROUND OF THE INVENTION

As a heat pump air conditioning system for vehicles, Japanese Patent Laid-Open Publication No. SHO-60-76414 "AIR CONDITIONER FOR VEHICLE", for example, is known. This air conditioner is shown in FIG. 8 hereof.

The conventional air conditioner shown in FIG. 8 consists of a compressor 102 driven by a subengine 101, an inside heat exchanger 104 for heat radiation and condensation of a high-temperature, high-pressure refrigerant gas flowing thereinto from the compressor 102 via a four-way valve 103 during heating, a heating expansion valve 106 connected to the inside heat exchanger 104 via a receiver 105, and an outside heat exchanger 107 for evaporation and heat absorption of the refrigerant gas throttled and expanded by the heating expansion valve 106. The refrigerant gas is returned from the outside heat exchanger 107 through the four-way valve 103 into the compressor 102.

A radiator fan 112 is mounted on the drive shaft of the subengine 101 via a gear unit 111. Changing the engagement of gears in the gear unit 111 causes the rotation direction of the radiator fan 112 to switch between the forward direction and the reverse direction. Specifically, when the outside air temperature is low and the heating performance is insufficient, the gear unit 111 usually switches the rotation direction of the radiator fan 112 to cause air flowing in the direction of arrow A to flow in the direction of arrow B, guiding the air heated around the engine to the outside heat exchanger 107 so that the outside heat exchanger 107 can effectively absorb the heat.

In the above air conditioner, when the vehicle travels at a high speed, the running wind cancels the flow of air in the direction of arrow B caused by the radiator fan 112, preventing the supply of heated air around the engine to the outside heat exchanger 107 and preventing effective heat absorption, and lowering heating performance.

It is thus desired to improve heat pump air conditioning systems for vehicles, increasing heating performances even with low outside air temperatures and high vehicle speeds, and thereby effectively heating the passenger compartments.

SUMMARY OF THE INVENTION

According to an aspect of the present invention, there is provided a heat pump air conditioning system for heating and cooling the passenger compartment of a vehicle, which system comprises: an inside heat exchanger disposed in the passenger compartment; an outside heat exchanger disposed in an engine compartment; refrigerant passages connecting the inside heat exchanger and the outside heat exchanger and charged with a refrigerant; and a compressor for compressing a refrigerant gas in the refrigerant passages; the outside heat exchanger comprising: a first outside heat exchanger disposed forward of an engine in the engine compartment to act as a heat radiator in cooling; and a second outside heat exchanger disposed in the vicinity of the engine in the engine compartment to act as a heat absorber in heating, utilizing the heat of the engine.

That is, since the second outside heat exchanger is operated as a heat absorber in heating, using the heat of the engine, the second outside heat exchanger can be prevented from being frosted even when the outside air temperature is low and the vehicle travels at a high speed. The engine waste heat can thus be efficiently absorbed, increasing the heating performance and allowing effective heating of the interior. Cooling can also be performed at the first outside heat exchanger as in the conventional manner.

Preferably, the second outside heat exchanger is provided with a fan for guiding air within the engine compartment thereto. That is, the fan can forcibly guide heated air inside the engine compartment to the second outside heat exchanger, increasing the degree of freedom in the installation location of the second outside heat exchanger in the engine compartment, and also increasing the heating effects.

BRIEF DESCRIPTION OF THE DRAWINGS

Preferred embodiments of the present invention will be described in detail below, by way of example only, with reference to the accompanying drawings, in which:

FIG. 5A illustrates details of a four-way valve of FIG. 1 during heating in the air conditioning system, while

FIGS. 6(*a*) to 6(*f*) are diagrams illustrating several examples of arrangements of a second outside heat exchanger and a fan in an engine compartment according to this invention;

DETAILED DESCRIPTION OF THE PREFERRED EMBODIMENTS

Figure 1:
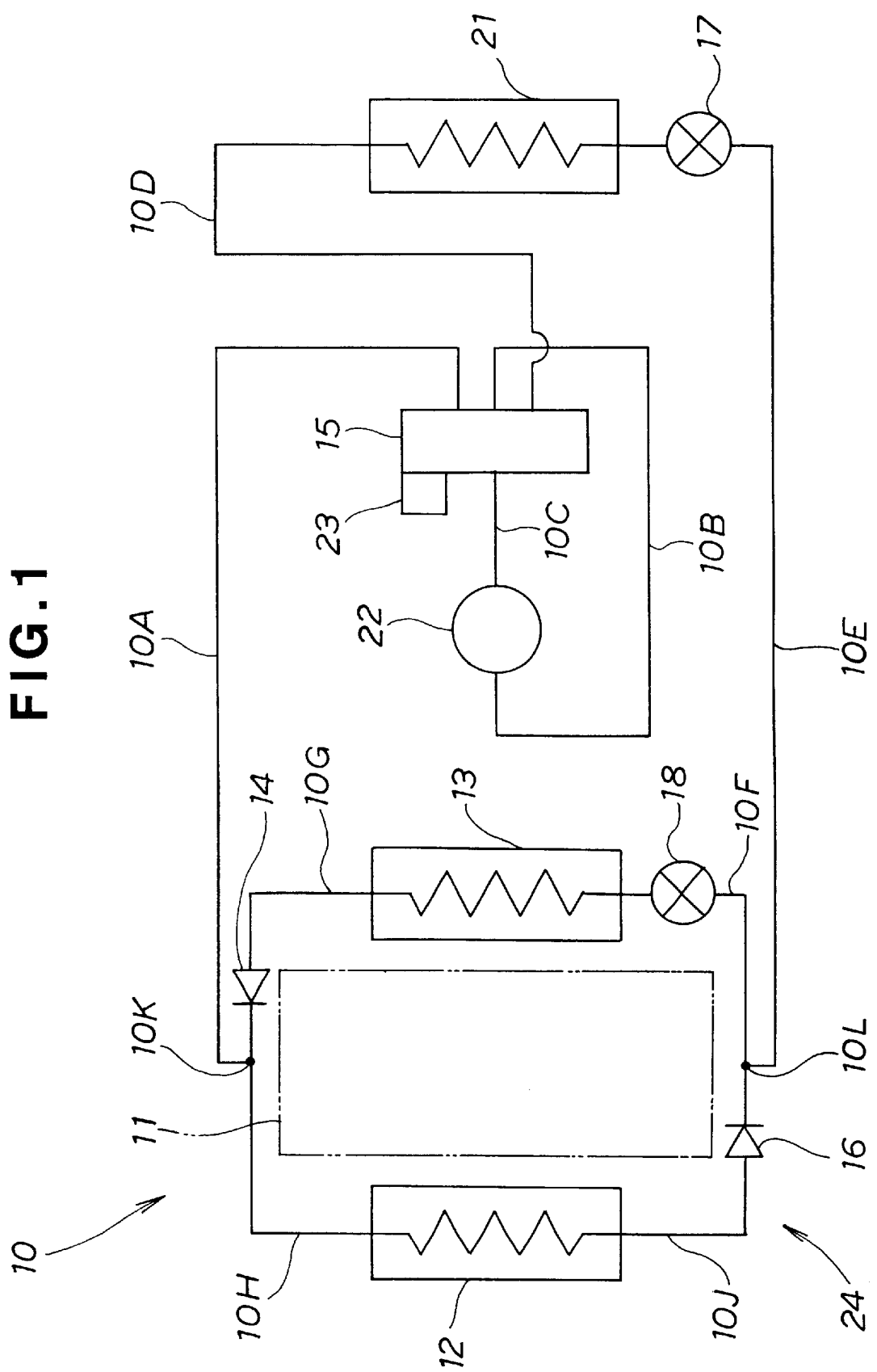
FIG. 1 is a schematic diagram of a heat pump air conditioning system according to the present invention.

Referring to FIG. 1, a heat pump air conditioning system 10 (hereinafter referred to only as an "air conditioning system 10") includes a first outside heat exchanger 12 disposed forward of an engine 11 in an engine compartment, a second outside heat exchanger 13 disposed rearward of the engine 11 also in the engine compartment, a four-way valve 15 directly connected to the first outside heat exchanger 12 and also connected to the second outside heat exchanger 13 via a one-way valve 14, an inside heat exchanger 21 disposed within the passenger compartment, connected at its one end to the four-way valve 15 and connected at the other end to the first outside heat exchanger 12 via a one-way valve 16 and a solenoid-operated valve 17 and also to the second outside heat exchanger 13 via an expansion valve 18 and the solenoid-operated valve 17, and a compressor 22 connected at both its refrigerant discharge and suction sides to the four-way valve 15. The above components are connected via refrigerant passages 10A to 10H and 10J for the refrigerant circulation. The above air conditioning system 10 draws heat from a low-temperature source to a high-temperature source and is thus called a heat pump.

Reference sign 10K denotes a connection between the refrigerant passages 10A, 10G and 10H, 10L a connection between the refrigerant passages 10E, 10F and 10J, and 23 a pilot valve attached to the four-way valve 15.

The above-described first outside heat exchanger 12 and the second outside heat exchanger 13 constitute an outside heat exchanger 24.

In cooling the passenger compartment, the first outside heat exchanger 12 radiates the heat of a high-temperature, high-pressure refrigerant gas passing therethrough for cooling and liquefaction, that is, acts as a condenser.

In heating the passenger compartment, the second outside heat exchanger 13 absorbs heat to evaporate and expand a refrigerant gas passing therethrough, that is, acts as an evaporator.

The four-way valve 15 changes the flow path of a refrigerant gas with the pilot valve 23 for switching between heating and cooling. The detail will be described later.

The solenoid-operated valve 17 throttles the flow path of a refrigerant, serving as an expansion valve, or fully opens the flow path, stopping the function as the expansion valve. In heating the passenger compartment, the solenoid-operated valve 17 fully opens, and in cooling the passenger compartment, serves as an expansion valve to expand a liquid refrigerant passing through the first outside heat exchanger 12 into a low-temperature, low-pressure atomized refrigerant for supply to the inside heat exchanger 21.

In heating the passenger compartment, the expansion valve 18 expands a liquid refrigerant passing through the inside heat exchanger 21 into a low-temperature, low-pressure atomized refrigerant for supply to the second outside heat exchanger 13.

In heating the passenger compartment, the inside heat exchanger 21 radiates the heat of a high-temperature, high-pressure refrigerant gas passing therethrough for cooling and liquefaction, that is, acts as a condenser, and in cooling the passenger compartment, evaporates and expands a refrigerant gas passing therethrough by absorbing heat (, cooling the passenger compartment), that is, acts as an evaporator.

The compressor 22 compresses a refrigerant gas into a high-temperature, high-pressure state.

Figure 2:
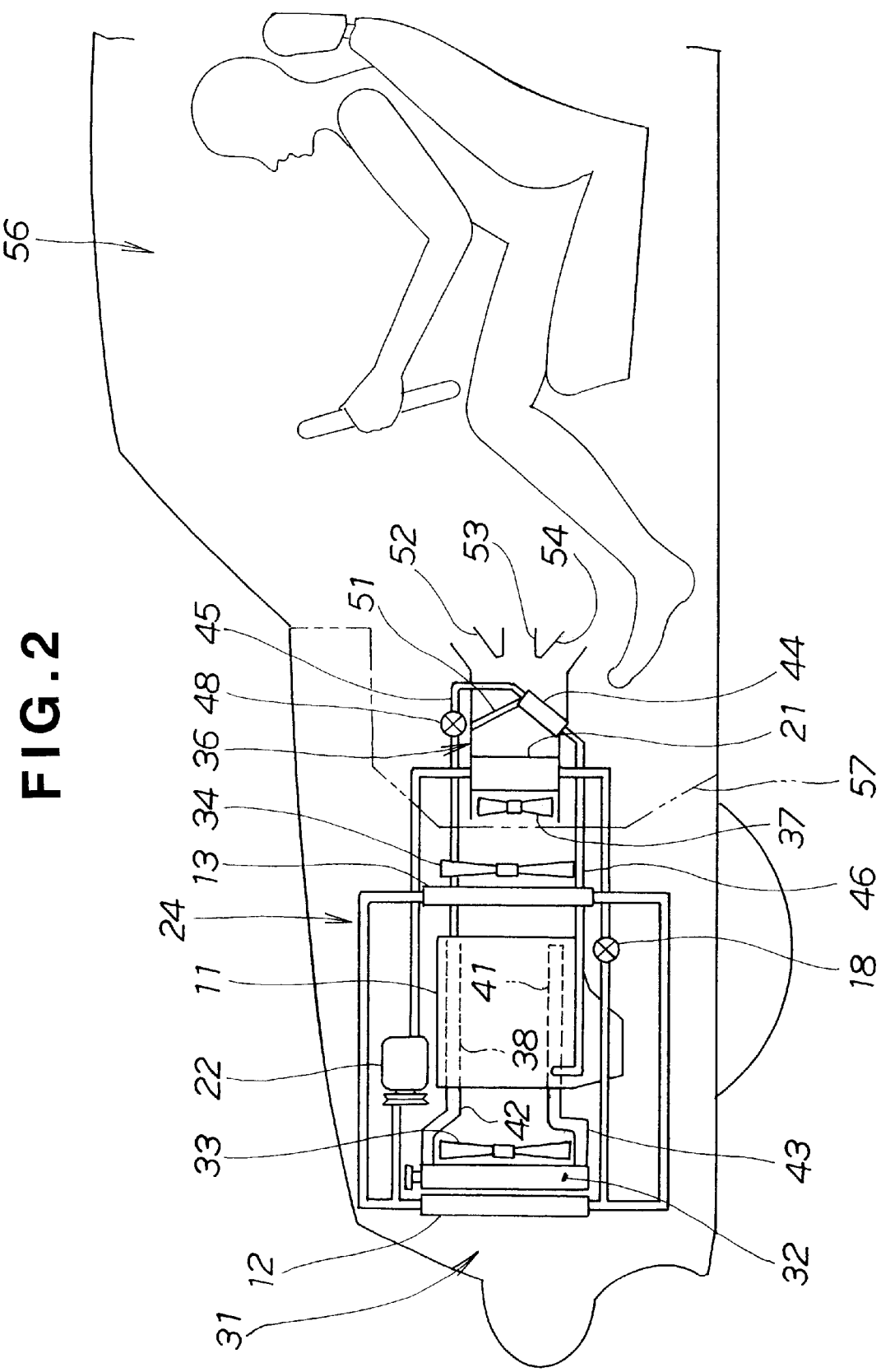
FIG. 2 is a schematic diagram of a vehicle equipped with the air conditioning system according to this invention.

FIG. 2 is a side view of a vehicle equipped with the air conditioning system 10 according to the present invention, illustrating an engine 11 disposed in an engine compartment 31, a radiator 32 and a fan 33 for the radiator 32 disposed forward of the engine 11, the first outside heat exchanger 12 disposed forward of the radiator 32, the second outside heat exchanger 13 and a fan 34 for the second outside heat exchanger 13 disposed rearward of the engine 11, the inside heat exchanger 21 provided in an inside air conditioning unit 36, connected at one end to one end of the first outside heat exchanger 12 via the compressor 22 and connected at the other end to the other end of the first outside heat exchanger 12 via the expansion valve 18, a fan 37 disposed forward of the inside heat exchanger 21, the second outside heat exchanger 13 connected in parallel with the first outside heat exchanger 12, coolant pipes 42 and 43 connecting coolant passages 38 and 41 of the engine 11 to the radiator 32, and heating pipes 45 and 46 connecting the coolant passages 38 and 41 to a heating heat exchanger 44 provided in the inside air conditioning unit 36.

Reference numeral 48 denotes a water valve interposed in the heating pipe 45, 51 an air mix damper provided in the inside air conditioning unit 36, 52 to 54 diffusers of the inside air conditioning unit 36 opposite to a passenger compartment 56, and 57 a partition wall dividing the engine compartment 31 from the passenger compartment 56.

The functions of the above-described air conditioning system 10 will be described below.

Figure 3:
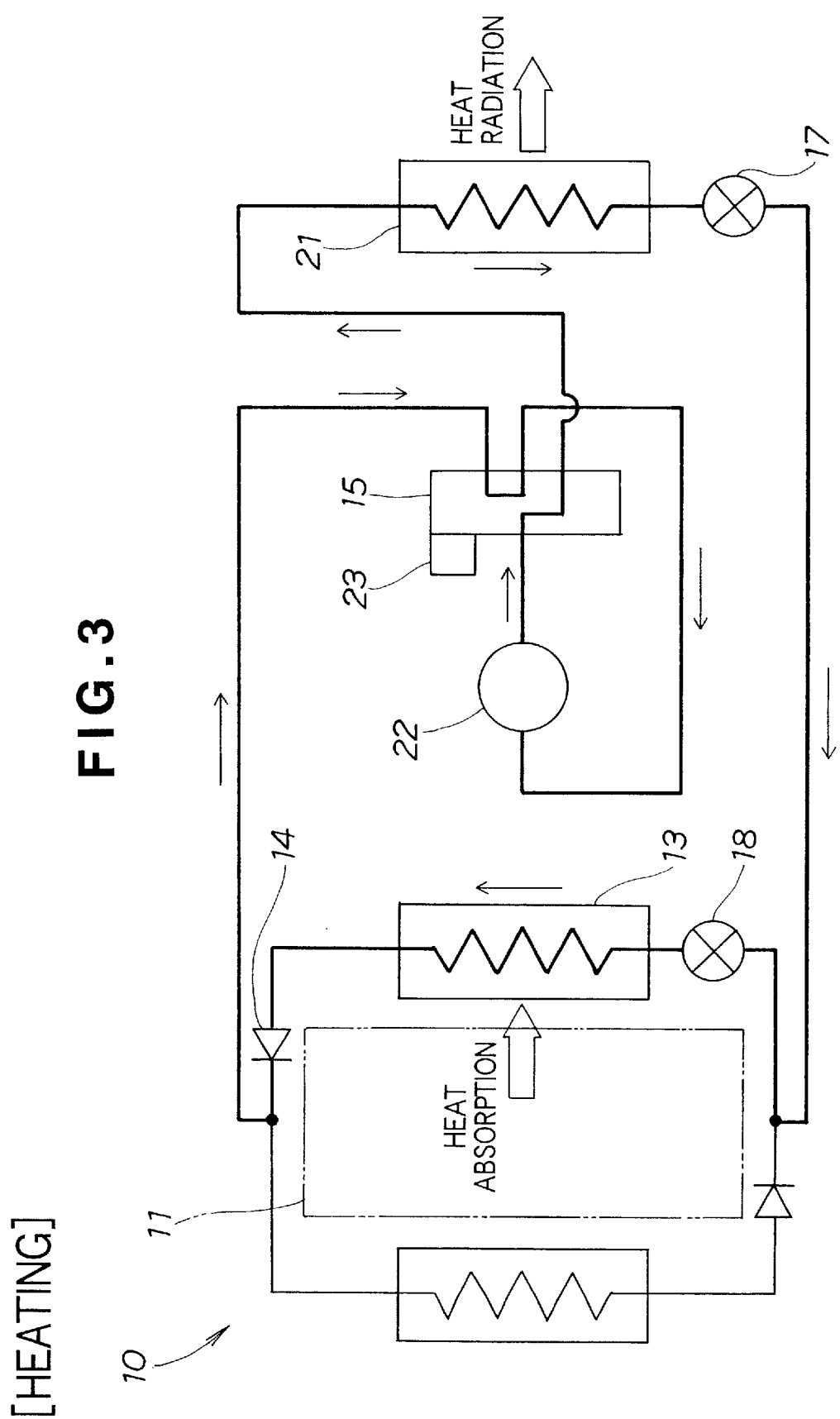
FIG. 3 is a schematic diagram illustrating the flow of a refrigerant during heating in the air conditioning system according to this invention.

FIG. 3 is a functional diagram illustrating the function of the air conditioning system 10 in heating according to the present invention.

When the compressor 22 is operated, a high-temperature, high-pressure gaseous refrigerant flows from the compressor 22 through the four-way valve 15 into the inside heat exchanger 21 as shown by arrows for radiating heat from the inside heat exchanger 21. The passenger compartment can thus be heated.

The gaseous refrigerant is lowered in temperature and liquefied, and thereafter passes through the fully-opened solenoid-operated valve 17, and then passes through the expansion valve 18, expanding and having a lowered pressure and temperature to be an atomized refrigerant, and then passes through the second outside heat exchanger 13. At that time, the refrigerant absorbs heat from the outside air, that is, air heated by the engine 11 for evaporation.

The gaseous refrigerant passing through the second outside heat exchanger 13 returns through the one-way valve 14 and the four-way valve 15 to the compressor 22, and the above cycle is repeated.

Figure 4:
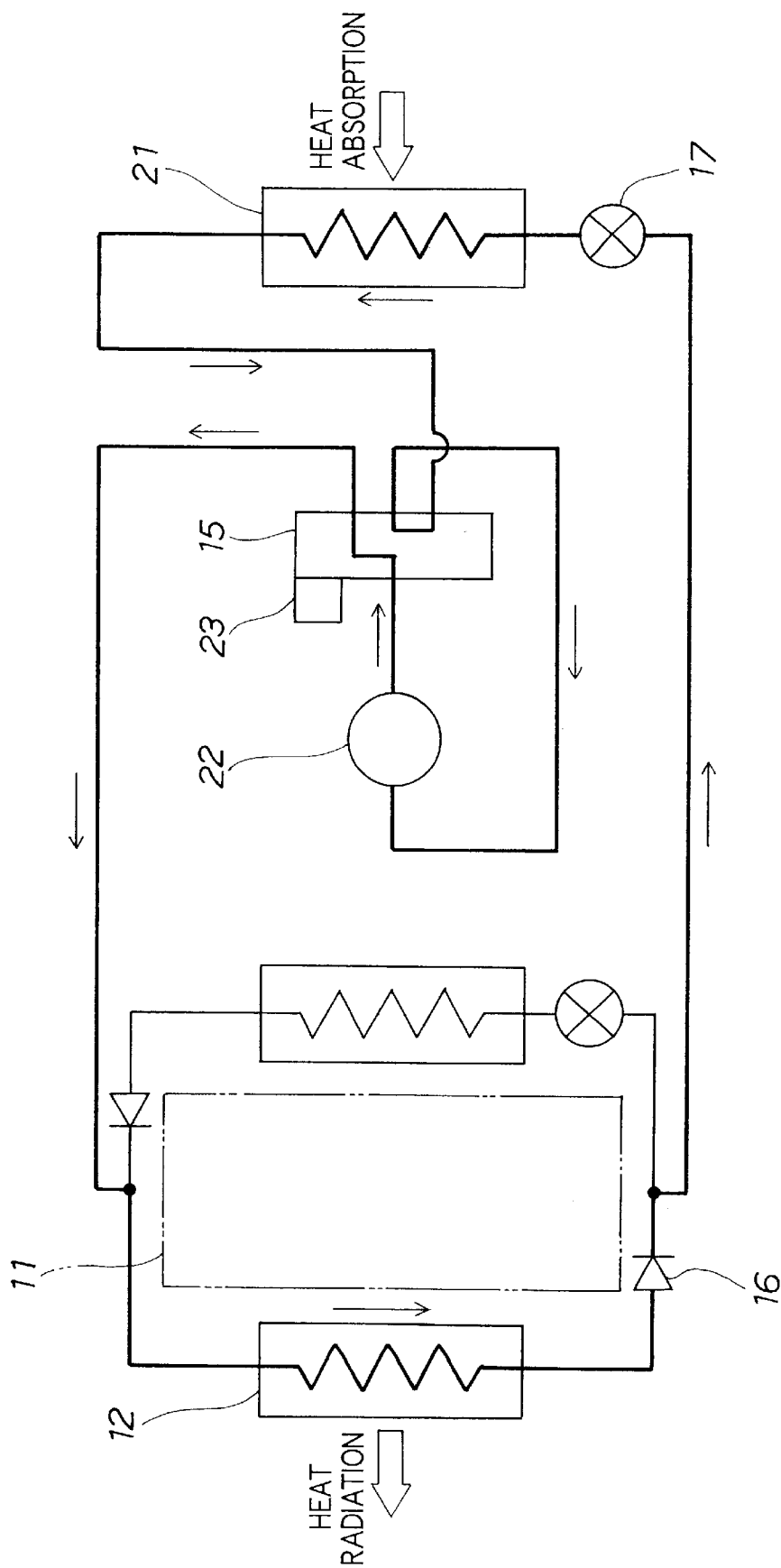
FIG. 4 is a schematic diagram illustrating the flow of a refrigerant during cooling in the air conditioning system according to this invention.

FIG. 4 is a functional diagram illustrating the function of the air conditioning system 10 during cooling according to the present invention.

When the compressor 22 is operated, a high-temperature, high-pressure gaseous refrigerant flows from the compressor 22 through the four-way valve 15 into the first outside heat exchanger 12 and radiates heat from the first outside heat exchanger 12.

The gaseous refrigerant passing through the first outside heat exchanger 12 is lowered in temperature and liquefied, and thereafter passes through the one-way valve 16 and further passes through the solenoid-operated valve 17 serving as an expansion valve by throttling the flow path. At that time, the liquid refrigerant is expanded and lowered in pressure and temperature to be an atomized refrigerant, and then passes through the inside heat exchanger 21. At that time, the refrigerant absorbs heat from the air within the passenger compartment for evaporation. In this way, the air inside the passenger compartment can be cooled to cool the passenger compartment. Thereafter the gaseous refrigerant returns through the four-way valve 15 to the compressor 22, and the above cycle is repeated.

Figure 5A:
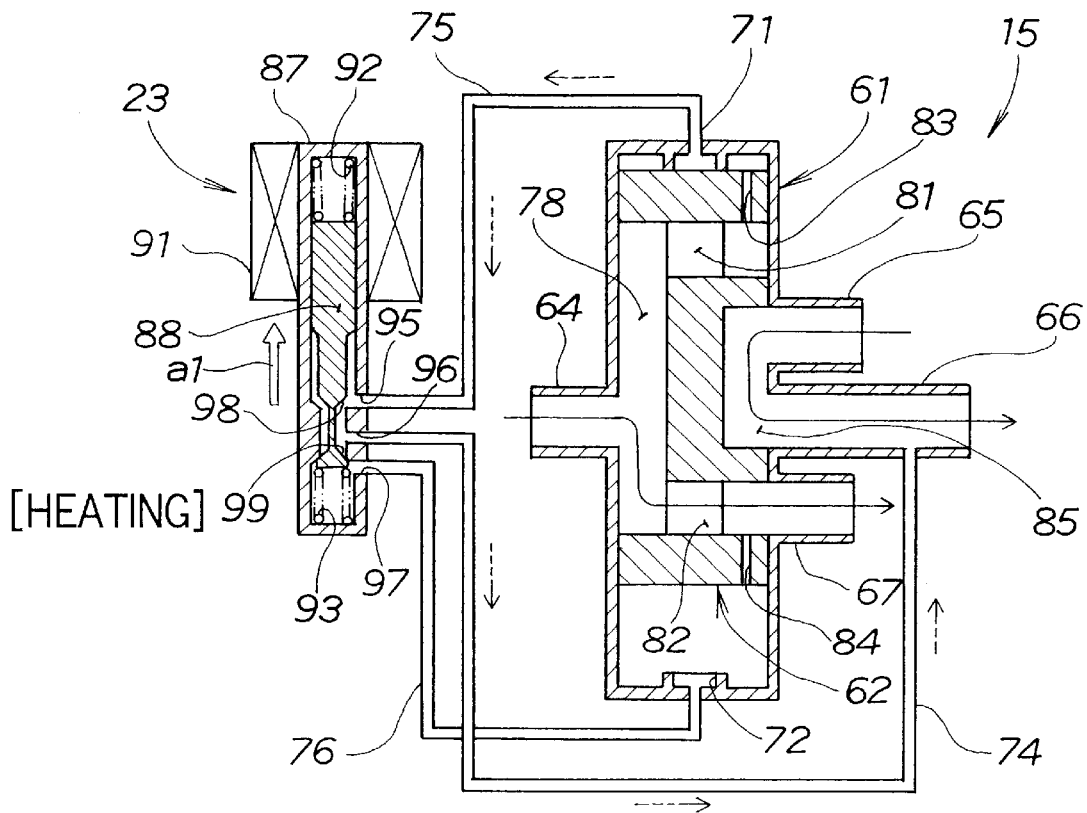
Figure 5B:
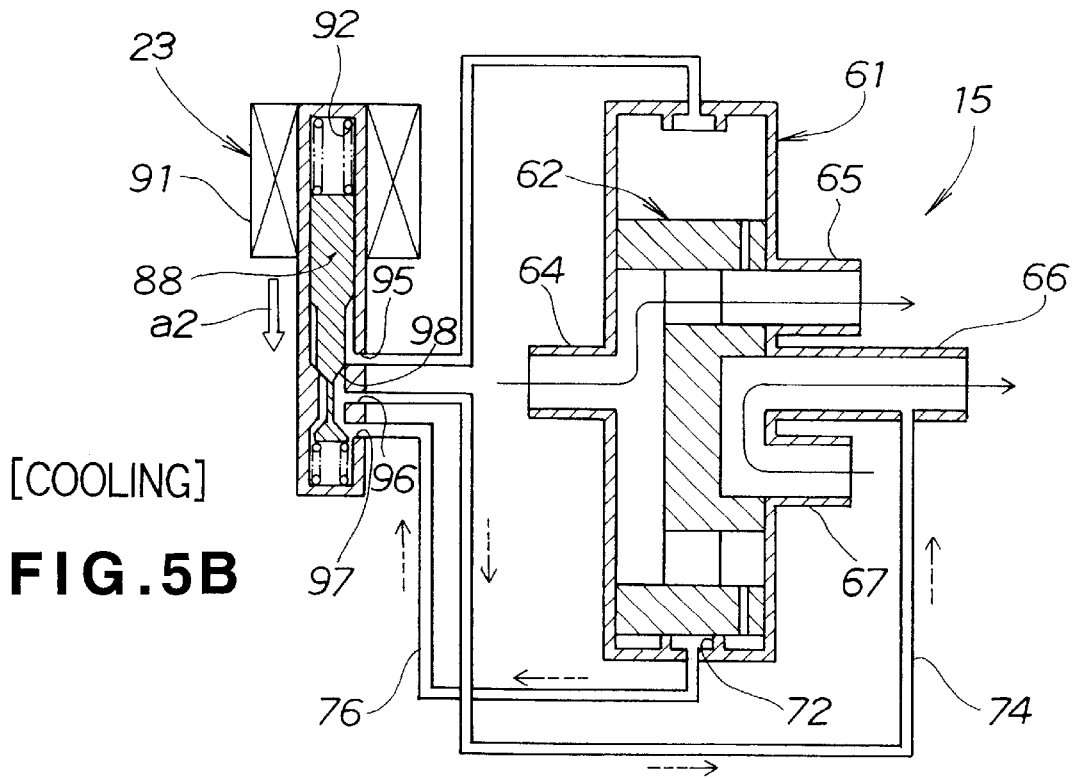
FIG. 5B illustrates details of the four-way valve during cooling.

FIGS. 5A and 5B illustrate the functions of the four-way valve 15 during heating and cooling.

Referring to FIG. 5A, the four-way valve 15 includes a valve case 61 and a valve body 62 movably inserted into the valve case 61.

The valve case 61 has an inlet 64 for letting a refrigerant in, a first passage opening 65, a second passage opening 66 and a third passage opening 67 for discharging or allowing the passage of the refrigerant, and a first suction port 71 and a second suction port 72 for applying negative pressure to move the valve body 62.

The second passage opening 66 is connected to the pilot valve 23 via a first pipe line 74.

The first suction port 71 and the second suction port 72 are connected to the pilot valve 23 via a second pipe line 75 and a third pipe line 76, respectively.

The valve body 62 has a first common groove 78 configured to continuously communicate with the suction port 64, extending in the longitudinal direction, a first transverse hole 81 and a second transverse hole 82 formed to extend from the ends of the first common groove 78 perpendicularly to the longitudinal direction, a first through hole 83 and a second through hole 84 passing through the ends of the valve body 62 from the first transverse hole 81 and the second transverse hole 82, and a second common groove 85 for selective communication between the first passage opening 65 and the second passage opening 66 or between the second passage opening 66 and the third passage opening 67.

The pilot valve 23 includes a cylinder 87, a plunger 88 movably inserted into the cylinder 87, a solenoid 91 attached to one end of the cylinder 87 for moving the plunger 88, a first spring 92 for generating a resilient force in a direction to distance the plunger 88 from the solenoid 91, and a second spring 93 for generating a resilient force in a direction to bring the plunger 88 closer to the solenoid 91.

The cylinder 87 has in its side surface a first port 95, a second port 96 and a third port 97. The first port 95 is connected to the second pipe line 75. The second port 96 is connected to the first pipe line 74. The third port 97 is connected to the third pipe line 76.

The plunger 88 is a member with a portion in the vicinity of its one end formed with a small diameter for switching the flow path of a refrigerant between the first port 95 to the third port 97, having a first tapered portion 98 for opening and closing the first port 95 and a second tapered portion 99 for opening and closing the third port 97.

The functions of the above-described pilot valve 23 will be described below.

When the solenoid 91 is energized, the plunger 88 is pulled toward the solenoid 91 as shown by arrow a1, and the second tapered portion 99 of the plunger 88 closes the third port 97. This brings communication between the first port 95 and the second port 96.

At that time, a refrigerant flows through the second passage opening 66, so that the flow of the refrigerant forms negative pressure in the first pipe line 74 and the refrigerant flows in the direction of arrows shown by broken lines. Specifically, the refrigerant passes from the first suction port 71 of the valve case 61, through the second pipe line 75, into the first port 95 and the second port 96, through the first pipe line 74, and into the second passage opening 66, so that the valve body 62 is drawn toward the first suction port 71.

As a result, the inlet 64 communicates with the third passage opening 67 and the first passage opening 65 communicates with the second passage opening 66, so that the refrigerant flows from the compressor 22 into the inside heat exchanger 21 and also flows from the second outside heat exchanger 13 into the compressor 22 as shown in FIG. 3, allowing the heating of the passenger compartment.

In FIG. 5B, when the energization of the solenoid 91 is stopped, the plunger 88 moves in a direction to depart from the solenoid 91 as shown by hollow arrow a2 by a resilient force of the first spring 92, and the first tapered portion 98 closes the first port 95. This brings communication between the second port 96 and the third port 97.

At that time, the refrigerant flows through the second passage opening 66, so that the flow of the refrigerant forms negative pressure in the first pipe line 74, and the refrigerant flows in a direction of arrows shown by broken lines. Specifically, the refrigerant flows from the second suction port 72 of the valve case 61, through the third pipe line 76, into the third port 97 and the second port 96, through the first pipe line 74, and into the second passage opening 66, so that the valve body 62 is drawn toward the second suction port 72.

As a result, the inlet 64 communicates with the first passage opening 65 and the second passage opening 66 communicates with the third passage opening 67, so that the refrigerant flows from the compressor 22 into the first outside heat exchanger 12 and also flows from the inside heat exchanger 21 into the compressor 22 as shown in FIG. 4, allowing the cooling of the passenger compartment.

FIGS. 6(a) to 6(f) illustrate several examples of arrangements of the second outside heat exchanger 13 and the fan 34 in the engine compartment according to the present invention.

FIG. 6(a) illustrates a state where the second outside heat exchanger 13 is disposed rearward of the engine 11 and the fan 34 for guiding air heated at the engine 11 to the second outside heat exchanger 13 is disposed rearward of the second outside heat exchanger 13. This state is the state shown in FIG. 2. Arrow a3 indicates the flow direction of air heated at the engine 11.

FIG. 6(b) illustrates a state where the second outside heat exchanger 13 is disposed above the engine 11 and the fan 34 is disposed above the second outside heat exchanger 13.

FIG. 6(c) illustrates a state where the second outside heat exchanger 13 is disposed rearward of and obliquely above the engine 11 and the fan 34 is disposed rearward of and obliquely above the second outside heat exchanger 13.

FIG. 6(d) illustrates a state where the second outside heat exchanger 13 is disposed above the engine 11 and the fan 34 is disposed below the second outside heat exchanger 13.

FIG. 6(e) illustrates a state where the second outside heat exchanger 13 is disposed below the engine 11 and the fan 34 is disposed below the second outside heat exchanger 13.

FIG. 6(f) illustrates a state where the second outside heat exchanger 13 is disposed rearward of and obliquely below the engine 11 and the fan 34 is disposed rearward of and obliquely below the second outside heat exchanger 13.

FIGS. 7(a) to 7(e) illustrate other examples of arrangements of the second outside heat exchanger 13 and the fan 34 in the engine compartment according to the present invention.

Figure 7:
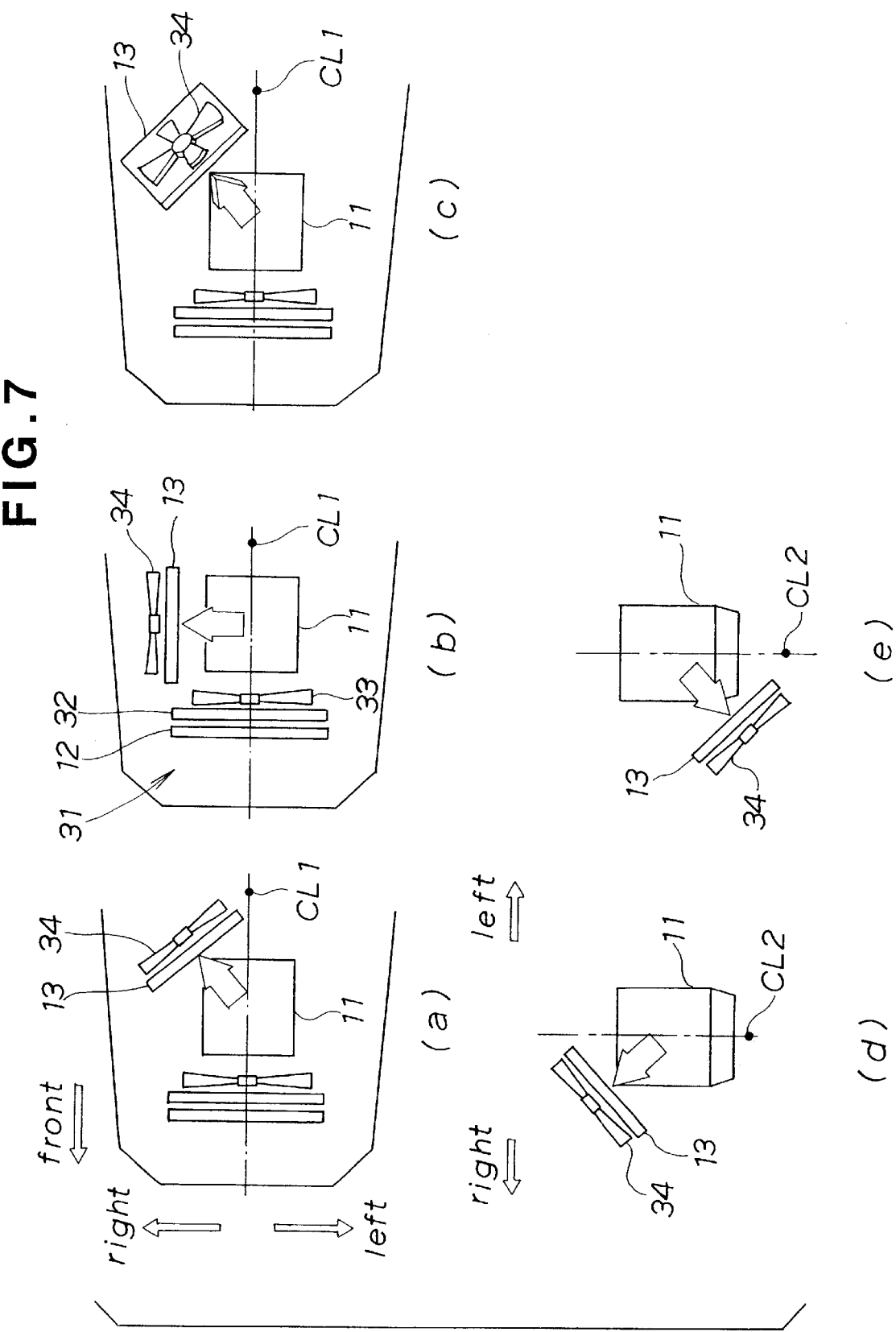
FIGS. 7(*a*) to 7(*e*) are diagrams illustrating other several examples of arrangements of the second outside heat exchanger and the fan in the engine compartment according to this invention.
Figure 8:
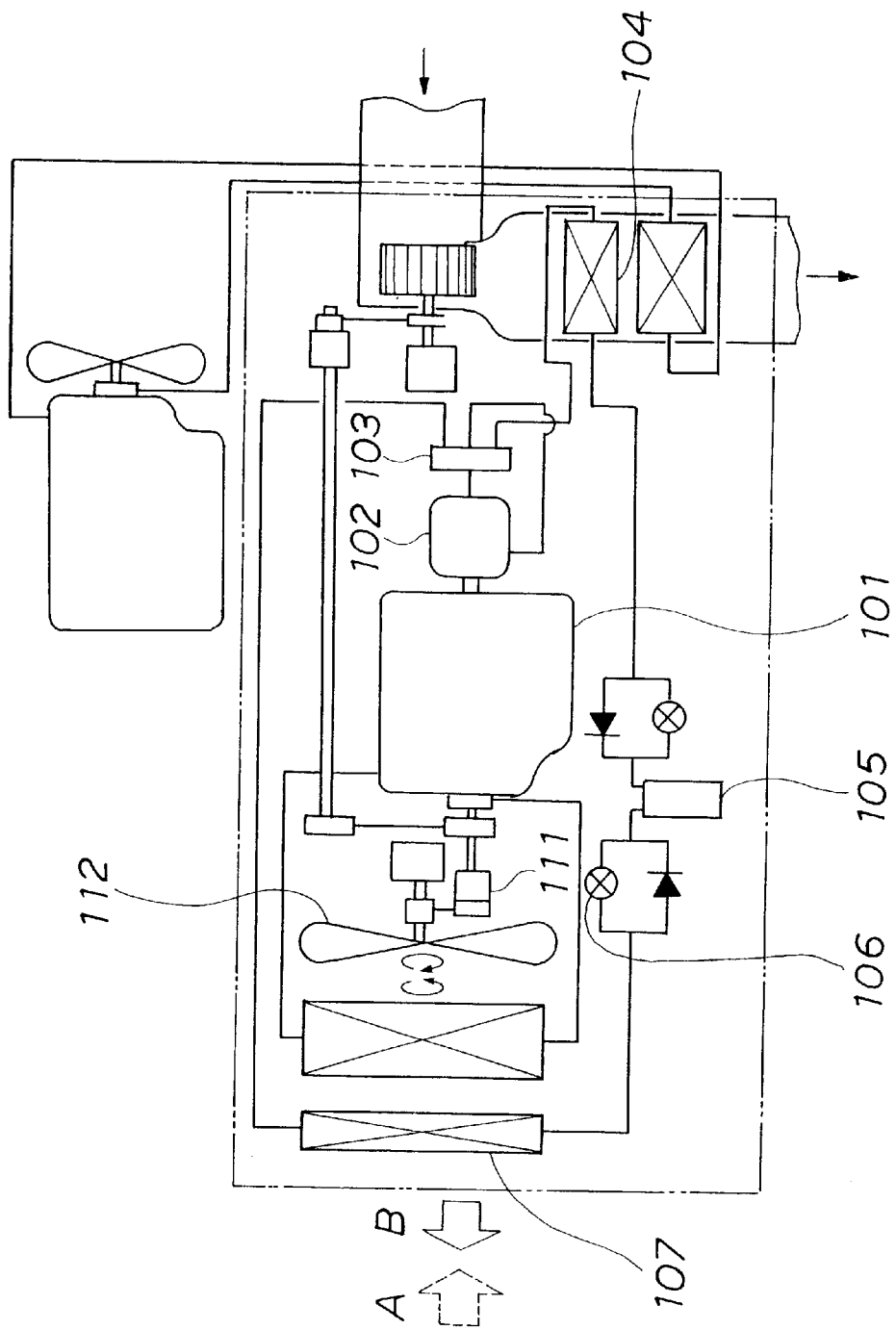
FIG. 8 is a diagram illustrating a conventional heat pump air conditioner.

FIG. 7(a) illustrates a state where the second outside heat exchanger 13 is disposed on the right and obliquely rearward of the engine 11 and the fan 34 is disposed on the right and obliquely rearward of the second outside heat exchanger 13.

FIG. 7(b) illustrates a state where the second outside heat exchanger 13 is disposed on the right of the engine 11 and the fan 34 is disposed on the right of the second outside heat exchanger 13.

FIG. 7(c) illustrates a state where the second outside heat exchanger 13 is disposed on the right and obliquely rearward of the engine 11 and also oriented obliquely upward, and the fan 34 is disposed on the right and obliquely rearward of the second outside heat exchanger 13 and also oriented obliquely upward.

FIG. 7(d) illustrates a state where the second outside heat exchanger 13 is disposed on the right of and obliquely above the engine 11 and the fan 34 is disposed on the right of and obliquely above the second outside heat exchanger 13.

FIG. 7(e) illustrates a state where the second outside heat exchanger 13 is disposed on the right of and obliquely below the engine 11 and the fan 34 is disposed on the right of and obliquely below the second outside heat exchanger 13.

In addition to the above-described examples of FIGS. 7(a) to 7(e), the symmetrically opposite arrangements of the second outside heat exchanger 13 and the fan 34 in FIGS. 7(a) to 7(e) with respect to the vehicle center lines (transverse center lines) CL1 and CL2 shown in FIGS. 7(a) to 7(e) are included in this embodiment.

As described with reference to FIGS. 1 and 2, the present invention is first characterized in that in the heat pump air conditioning system 10 for vehicles having the inside heat exchanger 21 disposed in the passenger compartment 56, the outside heat exchanger 24 disposed in the engine compartment 31, the refrigerant passages 10A to 10H and 10J which are connected to the inside heat exchanger 21 and the outside heat exchanger 24 and charged with a refrigerant, and the compressor 22 for compressing a refrigerant vapor in the refrigerant passages 10A to 10H and 10J, to switch the flow direction of the refrigerant to heat and cool the passenger compartment 56, the outside heat exchanger 24 consists of two units, the first outside heat exchanger 12 disposed forward of the engine 11 in the engine compartment 31 and acting as a heat radiator in cooling and the second outside heat exchanger 13 disposed in the vicinity of the engine 11 in the engine compartment 31 and acting as a heat absorber utilizing the heat of the engine 11 in heating.

Since the second outside heat exchanger 13 is operated as a heat absorber in heating, utilizing the heat of the engine 11, the second outside heat exchanger 13 can be prevented from being frosted even when the outside air temperature is low and the vehicle travels at a high speed. The engine waste heat can thus be efficiently absorbed, increasing the heating performance and allowing the effective heating of the passenger compartment 56. Cooling can also be performed at the first outside heat exchanger 12 as in the conventional manner.

The present invention is secondly characterized in that the second outside heat exchanger 13 is provided with the fan 34 for guiding air within the engine compartment 31 thereto.

Heated air inside the engine compartment 31 can be forcibly guided to the second outside heat exchanger 13 by the fan 34 and the second outside heat exchanger 13 can be disposed in any position inside the engine compartment 31 as desired, increasing the degree of freedom in the installation location of the second outside heat exchanger 13 in the engine compartment 31, and also increasing the heating effects.

In the embodiment of the present invention, the examples of arrangements of the second outside heat exchanger 13 and the fan 34 are shown in FIGS. 6(a) to 6(f) and FIGS. 7(a) to 7(e), but are not limiting. In the arrangement examples in FIGS. 6(a) to 6(f) except FIG. 6(d) and the arrangement examples in FIGS. 7(a) to 7(e), the fan 34 may be disposed between the engine 11 and the second outside heat exchanger 13 as shown in FIG. 6(d).

The present disclosure relates to the subject matter of Japanese Patent Application No. 2002-134595, filed May 9, 2002, the disclosure of which is expressly incorporated herein by reference in its entirety.

What is claimed is:

1. A heat pump air conditioning system for heating and cooling the passenger compartment of a vehicle, said system comprising:

an inside heat exchanger disposed in said passenger compartment;

an outside heat exchanger disposed in an engine compartment;

refrigerant passages connecting said inside heat exchanger and said outside heat exchanger and charged with a refrigerant; and a compressor for compressing a refrigerant gas in said refrigerant passages;

said outside heat exchanger comprising:

a first outside heat exchanger disposed forward of an engine in said engine compartment to act as a heat radiator in cooling; and a second outside heat exchanger disposed in the vicinity of said engine in said engine compartment to act as a heat absorber in heating, utilizing the heat of said engine.

2. An air conditioning system as set forth in claim 1, wherein said second outside heat exchanger is provided with a fan for guiding air within said engine compartment thereto.

* * * * *